(12) United States Patent
Truettner et al.

(10) Patent No.: US 12,283,841 B2
(45) Date of Patent: Apr. 22, 2025

(54) MODULAR DEVICE WITH SOLAR POWER SUPPLY

(71) Applicant: Milwaukee Electric Tool Corporation, Brookfield, WI (US)

(72) Inventors: Donald J. Truettner, Waukesha, WI (US); Kyle C. Fassbender, Brookfield, WI (US); Joseph Marco, Fox Point, WI (US); Timothy Nowak, Glenview, IL (US); Sean Roberts, Milwaukee, WI (US); Steven Zipparro, Bartlett, IL (US); Samuel Feldner, Orland Park, IL (US); Caleb Nathaniel Hille, West Chester, OH (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 653 days.

(21) Appl. No.: 17/492,232

(22) Filed: Oct. 1, 2021

(65) Prior Publication Data
US 2022/0109321 A1 Apr. 7, 2022

Related U.S. Application Data

(63) Continuation of application No. PCT/US2021/050846, filed on Sep. 17, 2021.
(Continued)

(51) Int. Cl.
*H02J 7/35* (2006.01)
*H02J 7/00* (2006.01)
(Continued)

(52) U.S. Cl.
CPC .............. *H02J 7/35* (2013.01); *H02J 7/0042* (2013.01); *H02S 10/40* (2014.12); *H02S 30/20* (2014.12)

(58) Field of Classification Search
CPC ......................................................... H02J 7/35
See application file for complete search history.

(56) References Cited

U.S. PATENT DOCUMENTS

| 3,424,334 A | 1/1969 | Goltz |
| 5,890,613 A | 4/1999 | Williams |

(Continued)

FOREIGN PATENT DOCUMENTS

| CN | 204119137 | 1/2015 |
| CN | 104669226 | 6/2015 |

(Continued)

OTHER PUBLICATIONS

International Search Report and Written Opinion for International Application No. PCT/US2020/046359, dated Nov. 25, 2020, 11 pages.
(Continued)

*Primary Examiner* — Robert Grant
(74) *Attorney, Agent, or Firm* — Reinhart Boerner Van Deuren s.c.

(57) ABSTRACT

Various modular systems including a power unit are shown. In one example, a power unit includes a solar panel, a power storage device and one or more power outlet interfaces. One of the surfaces of the power unit includes a coupling mechanism that permits that power unit to couple with modular storage units. In one embodiment, the modular system includes a frame and wheels coupled to the frame to permit the power unit to be more easily transported.

22 Claims, 8 Drawing Sheets

Related U.S. Application Data

(60) Provisional application No. 63/086,944, filed on Oct. 2, 2020.

(51) Int. Cl.
  *H02S 10/40* (2014.01)
  *H02S 30/20* (2014.01)

(56) References Cited

U.S. PATENT DOCUMENTS

| | | | |
|---|---|---|---|
| 6,983,946 B2 | 1/2006 | Sullivan et al. | |
| 8,415,921 B1 | 4/2013 | Castellanos et al. | |
| 8,415,924 B2 | 4/2013 | Matthias et al. | |
| 8,740,010 B1 | 6/2014 | Page | |
| 8,890,478 B2 | 11/2014 | Matthias et al. | |
| 9,112,356 B2 | 8/2015 | Cover | |
| 9,375,835 B1 | 6/2016 | Lin | |
| 9,381,640 B2 | 7/2016 | Van Der Linde et al. | |
| 10,293,476 B2 | 5/2019 | Fleischmann | |
| 10,324,133 B2 | 6/2019 | Zeng | |
| 10,574,067 B1 | 2/2020 | Hanson | |
| 10,583,962 B2 | 3/2020 | Brunner et al. | |
| 10,618,692 B2* | 4/2020 | Hori | B65D 25/04 |
| 10,651,664 B2 | 5/2020 | Sergyeyenko | |
| 10,750,833 B2 | 8/2020 | Burchia | |
| 2003/0139080 A1 | 7/2003 | Lafragette et al. | |
| 2004/0211457 A1 | 10/2004 | Azzam et al. | |
| 2006/0006838 A1 | 1/2006 | Clarke | |
| 2007/0138041 A1 | 6/2007 | Welsh | |
| 2010/0085745 A1 | 4/2010 | Charriez et al. | |
| 2010/0231161 A1 | 9/2010 | Brown | |
| 2011/0260588 A1 | 10/2011 | Lin | |
| 2012/0293111 A1* | 11/2012 | Sentinelli | H02S 30/20 320/101 |
| 2013/0048631 A1 | 2/2013 | Van Der Linde et al. | |
| 2013/0051080 A1 | 2/2013 | Van Der Linde et al. | |
| 2013/0058711 A1 | 3/2013 | Van Der Linde et al. | |
| 2013/0127129 A1 | 5/2013 | Bensman et al. | |
| 2013/0134276 A1 | 5/2013 | Van Der Linde et al. | |
| 2013/0176688 A1 | 7/2013 | Shen et al. | |
| 2014/0265440 A1 | 9/2014 | Chen et al. | |
| 2015/0078811 A1 | 3/2015 | Van Der Linde et al. | |
| 2015/0349699 A1* | 12/2015 | Chambe | H02S 20/30 136/246 |
| 2017/0063114 A1 | 3/2017 | Briere | |
| 2017/0166352 A1 | 6/2017 | Hoppe et al. | |
| 2018/0062145 A1 | 3/2018 | Yang | |
| 2018/0161975 A1 | 6/2018 | Brunner | |
| 2018/0183250 A1 | 6/2018 | Byrne et al. | |
| 2018/0186513 A1 | 7/2018 | Brunner | |
| 2019/0013766 A1* | 1/2019 | Stach | H01R 25/006 |
| 2019/0105992 A1* | 4/2019 | Bucknell | B60L 8/003 |
| 2019/0225371 A1 | 7/2019 | Hoppe et al. | |
| 2020/0147781 A1 | 5/2020 | Squiers et al. | |
| 2020/0165036 A1 | 5/2020 | Squiers et al. | |
| 2021/0253193 A1* | 8/2021 | Liu | B62K 3/002 |

FOREIGN PATENT DOCUMENTS

| | | |
|---|---|---|
| CN | 206211558 | 5/2017 |
| CN | 206313514 | 7/2017 |
| CN | 206465063 | 9/2017 |
| CN | 208149497 | 11/2018 |
| CN | 109617218 | 4/2019 |
| CN | 208697388 | 4/2019 |
| CN | 210436119 | 5/2020 |
| DE | 102008052158 | 4/2010 |
| DE | 102012213047 | 1/2014 |
| DE | 202014103695 | 10/2014 |
| DE | 102017211006 | 1/2019 |
| DE | 102018102982 | 8/2019 |
| EP | 1724069 A2 | 11/2006 |
| EP | 2537641 B1 | 9/2016 |
| EP | 2338650 B1 | 10/2016 |
| GB | 2211486 | 7/1989 |
| KR | 10-2000-0073212 | 12/2000 |
| KR | 10-2016-0120822 | 10/2016 |
| WO | WO9839831 | 9/1998 |
| WO | WO11151110 | 12/2011 |
| WO | WO 2013/036609 | 3/2013 |
| WO | WO14070858 | 5/2014 |
| WO | WO2014/125484 | 8/2014 |
| WO | WO 2019/028041 | 2/2019 |
| WO | WO2021/034658 | 2/2021 |

OTHER PUBLICATIONS

International Search Report and Written Opinion for International Application No. PCT/US2021/050846, dated Jan. 7, 2022, 10 pages.
Inter Partes Review No. 2024-01400, "Petition for Inter Partes Review of U.S. Pat. No. 11,365,026" Filed Sep. 17, 2024, 147 pages.
Exhibit 1001 in Petition for Inter Partes Review of U.S. Pat. No. 11,365,026 Filed Sep. 17, 2024, 66 pages.
Exhibit 1002 in Petition for Inter Partes Review of U.S. Pat. No. 11,365,026 Filed Sep. 17, 2024, 324 pages.
Exhibit 1003 in Petition for Inter Partes Review of U.S. Pat. No. 11,365,026 Filed Sep. 17, 2024, 139 pages.
Exhibit 1004 in Petition for Inter Partes Review of U.S. Pat. No. 11,365,026 Filed Sep. 17, 2024, 17 pages.
Exhibit 1005 in Petition for Inter Partes Review of U.S. Pat. No. 11,365,026 Filed Sep. 17, 2024, 9 pages.
Exhibit 1006 in Petition for Inter Partes Review of U.S. Pat. No. 11,365,026 Filed Sep. 17, 2024, 21 pages.
Exhibit 1007 in Petition for Inter Partes Review of U.S. Pat. No. 11,365,026 Filed Sep. 17, 2024, 16 pages.
Exhibit 1008 in Petition for Inter Partes Review of U.S. Pat. No. 11,365,026 Filed Sep. 17, 2024, 31 pages.
Exhibit 1009 in Petition for Inter Partes Review of U.S. Pat. No. 11,365,026 Filed Sep. 17, 2024, 6 pages.
Exhibit 1010 in Petition for Inter Partes Review of U.S. Pat. No. 11,365,026 Filed Sep. 17, 2024, 4 pages.
Exhibit 1011 in Petition for Inter Partes Review of U.S. Pat. No. 11,365,026 Filed Sep. 17, 2024, 16 pages.
Exhibit 1012 in Petition for Inter Partes Review of U.S. Pat. No. 11,365,026 Filed Sep. 17, 2024, 8 pages.
Exhibit 1013 in Petition for Inter Partes Review of U.S. Pat. No. 11,365,026 Filed Sep. 17, 2024, 19 pages.
Exhibit 1014 in Petition for Inter Partes Review of U.S. Pat. No. 11,365,026 Filed Sep. 17, 2024, 35 pages.
Exhibit 1015 in Petition for Inter Partes Review of U.S. Pat. No. 11,365,026 Filed Sep. 17, 2024, 11 pages.
Exhibit 1016 in Petition for Inter Partes Review of U.S. Pat. No. 11,365,026 Filed Sep. 17, 2024, 193 pages.
Exhibit 1017 in Petition for Inter Partes Review of U.S. Pat. No. 11,365,026 Filed Sep. 17, 2024, 29 pages.
Exhibit 1018 in Petition for Inter Partes Review of U.S. Pat. No. 11,365,026 Filed Sep. 17, 2024, 15 pages.
Exhibit 1019 in Petition for Inter Partes Review of U.S. Pat. No. 11,365,026 Filed Sep. 17, 2024, 19 pages.
Exhibit 1020 in Petition for Inter Partes Review of U.S. Pat. No. 11,365,026 Filed Sep. 17, 2024, 18 pages.
Exhibit 1021 in Petition for Inter Partes Review of U.S. Pat. No. 11,365,026 Filed Sep. 17, 2024, 313 pages.
Exhibit 1030 in Petition for Inter Partes Review of U.S. Pat. No. 11,365,026 Filed Sep. 17, 2024, 95 pages.
Exhibit 1031 in Petition for Inter Partes Review of U.S. Pat. No. 11,365,026 Filed Sep. 17, 2024, 5 pages.
Exhibit 1032 in Petition for Inter Partes Review of U.S. Pat. No. 11,365,026 Filed Sep. 17, 2024, 19 pages.
Inter Partes Review No. 2024-01401, "Petition for Inter Partes Review of U.S. Pat. No. 11,794,952" Filed Sep. 17, 2024, 165 pages.
Exhibit 1001 in Petition for Inter Partes Review of U.S. Pat. No. 11,794,952 Filed Sep. 17, 2024, 67 pages.
Exhibit 1002 Part 1 in Petition for Inter Partes Review of U.S. Pat. No. 11,794,952 Filed Sep. 17, 2024, 227 pages.

(56) References Cited

OTHER PUBLICATIONS

Exhibit 1002 Part 2 in Petition for Inter Partes Review of U.S. Pat. No. 11,794,952 Filed Sep. 17, 2024, 278 pages.
Exhibit 1003 in Petition for Inter Partes Review of U.S. Pat. No. 11,794,952 Filed Sep. 17, 2024, 168 pages.
Exhibit 1004 in Petition for Inter Partes Review of U.S. Pat. No. 11,794,952 Filed Sep. 17, 2024, 17 pages.
Exhibit 1005 in Petition for Inter Partes Review of U.S. Pat. No. 11,794,952 Filed Sep. 17, 2024, 9 pages.
Exhibit 1006 in Petition for Inter Partes Review of U.S. Pat. No. 11,794,952 Filed Sep. 17, 2024, 21 pages.
Exhibit 1007 in Petition for Inter Partes Review of U.S. Pat. No. 11,794,952 Filed Sep. 17, 2024, 16 pages.
Exhibit 1008 in Petition for Inter Partes Review of U.S. Pat. No. 11,794,952 Filed Sep. 17, 2024, 31 pages.
Exhibit 1009 in Petition for Inter Partes Review of U.S. Pat. No. 11,794,952 Filed Sep. 17, 2024, 6 pages.
Exhibit 1010 in Petition for Inter Partes Review of U.S. Pat. No. 11,794,952 Filed Sep. 17, 2024, 4 pages.
Exhibit 1011 in Petition for Inter Partes Review of U.S. Pat. No. 11,794,952 Filed Sep. 17, 2024, 16 pages.
Exhibit 1012 in Petition for Inter Partes Review of U.S. Pat. No. 11,794,952 Filed Sep. 17, 2024, 8 pages.
Exhibit 1013 in Petition for Inter Partes Review of U.S. Pat. No. 11,794,952 Filed Sep. 17, 2024, 19 pages.
Exhibit 1014 in Petition for Inter Partes Review of U.S. Pat. No. 11,794,952 Filed Sep. 17, 2024, 35 pages.
Exhibit 1015 in Petition for Inter Partes Review of U.S. Pat. No. 11,794,952 Filed Sep. 17, 2024, 11 pages.
Exhibit 1016 in Petition for Inter Partes Review of U.S. Pat. No. 11,794,952 Filed Sep. 17, 2024, 193 pages.
Exhibit 1017 in Petition for Inter Partes Review of U.S. Pat. No. 11,794,952 Filed Sep. 17, 2024, 29 pages.
Exhibit 1018 in Petition for Inter Partes Review of U.S. Pat. No. 11,794,952 Filed Sep. 17, 2024, 15 pages.
Exhibit 1019 in Petition for Inter Partes Review of U.S. Pat. No. 11,794,952 Filed Sep. 17, 2024, 19 pages.
Exhibit 1020 in Petition for Inter Partes Review of U.S. Pat. No. 11,794,952 Filed Sep. 17, 2024, 18 pages.
Exhibit 1021 in Petition for Inter Partes Review of U.S. Pat. No. 11,794,952 Filed Sep. 17, 2024, 313 pages.
Exhibit 1022 in Petition for Inter Partes Review of U.S. Pat. No. 11,794,952 Filed Sep. 17, 2024, 324 pages.
Exhibit 1023 in Petition for Inter Partes Review of U.S. Pat. No. 11,794,952 Filed Sep. 17, 2024, 5 pages.
Exhibit 1024 in Petition for Inter Partes Review of U.S. Pat. No. 11,794,952 Filed Sep. 17, 2024, 7 pages.
Exhibit 1025 in Petition for Inter Partes Review of U.S. Pat. No. 11,794,952 Filed Sep. 17, 2024, 15 pages.
Exhibit 1026 in Petition for Inter Partes Review of U.S. Pat. No. 11,794,952 Filed Sep. 17, 2024, 37 pages.
Exhibit 1027 in Petition for Inter Partes Review of U.S. Pat. No. 11,794,952 Filed Sep. 17, 2024, 7 pages.
Exhibit 1028 in Petition for Inter Partes Review of U.S. Pat. No. 11,794,952 Filed Sep. 17, 2024, 33 pages.
Exhibit 1030 in Petition for Inter Partes Review of U.S. Pat. No. 11,794,952 Filed Sep. 17, 2024, 95 pages.
Exhibit 1031 in Petition for Inter Partes Review of U.S. Pat. No. 11,794, 952 Filed Sep. 17, 2024, 5 pages.
Exhibit 1032 in Petition for Inter Partes Review of U.S. Pat. No. 11,794,952 Filed Sep. 17, 2024, 60 pages.

\* cited by examiner

MODULAR DEVICE WITH SOLAR POWER SUPPLY

CROSS-REFERENCE TO RELATED PATENT APPLICATION

The present application is a continuation of International Application No. PCT/US2021/050846, filed Sep. 17, 2021, which claims the benefit of and priority to U.S. Provisional Application No. 63/086,944, filed on Oct. 2, 2020, which is incorporated herein by reference in its entirety.

BACKGROUND OF THE INVENTION

The present disclosure relates generally to the field of modular utility modules. The present disclosure relates specifically to a modular, portable, utility module with a solar power supply.

Tool storage units are often used to transport tools and tool accessories. Some storage units are designed to incorporate into a modular storage system. Within a modular storage system, different units, devices and/or containers may provide varying functions, such as being adapted to provide power from solar energy.

SUMMARY OF THE INVENTION

One embodiment of the invention relates to a modular system including a frame, a plurality of wheels coupled to the frame, a solar array detachably coupled to the frame, a first utility module coupled to the frame, and a second utility module coupled to the first utility module. The second utility module includes a power tool battery interface configured to physically couple with a rechargeable power tool battery that receives power from the solar array.

Another embodiment of the invention relates to a modular system including a first utility module, a solar array configured to detachably couple to the first utility module, and a second utility module coupled to the first utility module. The first utility module includes a housing defining a first width and a first depth perpendicular to the first width, and an electrical system. The solar array is electrically coupled to the electrical system. The solar array is configured to actuate between an expanded configuration and a contracted configuration smaller than the expanded configuration. When the solar array is arranged in the expanded configuration, the solar array defines a second width and a second depth more than twice the first width and the first depth of the first utility module, respectively. The second utility module includes a power tool battery interface configured to physically couple with a rechargeable power tool battery that receives power from the solar array.

Another embodiment of the invention relates to a modular system including a first utility module comprising a housing comprising a top surface, a solar array, and a second utility module coupled to the first utility module. The first utility module includes a first plurality of coupling components located along the top surface. The solar array is configured to actuate between an expanded configuration and a contracted configuration smaller than the expanded configuration. The solar array includes a second plurality of coupling components configured to detachably engage with the first plurality of coupling components of the first utility module such that the solar array in the contracted configuration is removeably coupled to the first utility module. The second utility module includes a power tool battery interface configured to physically couple with a rechargeable power tool battery that receives power from the solar array.

One embodiment of the disclosure relates to a modular system including a first utility module, a second utility module, and a solar array. The first utility module includes a first plurality of coupling components extending from the housing. The first utility module defines a first width and a first depth. The solar array actuates between an expanded configuration and a retracted configuration having a surface area less than a surface area of the expanded configuration. When the solar array is arranged in the expanded configuration, the solar array defines a second width and a second depth more than twice the first width and the first depth of the first utility module, respectively. The second utility module includes a second plurality of coupling components configured to detachably couple with the first plurality of coupling components.

In a specific embodiment, the modular system includes a frame coupled to the first utility module, a handle extending from the frame, and an interface configured to couple the solar panel to the handle. In a specific embodiment, the solar panel is pivotally coupled to the frame via the handle. In a specific embodiment, the modular system includes a power tool battery interface configured to physically couple with a rechargeable power tool battery, the power tool battery interface being electrically coupled to the solar panel and configured to receive power from the solar panel and provide the power to the rechargeable power tool battery.

In a specific embodiment, the power tool battery interface is housed in the second utility module. In a specific embodiment, the modular system includes a power converter, and the power tool battery interface receives power from the solar panel via the power converter. In a specific embodiment, the power converter is housed in the first utility module. In a specific embodiment, the modular system includes an electrical system that generates a signal indicating a preferred orientation of the solar panel. In a specific embodiment, the signal is generated based at least in part on GPS data. In a specific embodiment, the modular system includes a battery electrically coupled to the solar panel and configured to receive power from the solar panel. In a specific embodiment, the modular system includes a plurality of power outlets configured to provide power received from the battery, such as a USB-compatible power outlet.

Another embodiment of the disclosure relates to a utility module including a housing, a first plurality of coupling components, an electrical system, a solar array, and a power tool battery interface configured to physically couple with a rechargeable power tool battery. The first plurality of coupling components are located along the upper surface of the housing and are configured to couple the utility module to a second utility module. The solar array is electrically coupled to the electrical system. The solar array can be actuated between an expanded configuration and a retracted configuration having a surface area less than a surface area of the expanded configuration.

Additional features and advantages will be set forth in the detailed description, which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION

Referring generally to the figures, various embodiments of a mobile modular power system are shown. The modular system includes a first utility module and a solar array. The solar array is expandable and retractable. When retracted, the solar array generally fits within the footprint of the modular system, thereby facilitating its transport. The first utility module includes one or more components that distribute power, such as one or more battery interfaces for rechargeable power tool batteries, one or more power outlets, such as USB-compatible outlets, and/or an internal battery to temporarily store power received from the solar array. In some embodiments, the modular system is mobile, such as via the housing being coupled to a frame with wheels. Applicant has observed that finding a power supply at some construction work sites can be problematic. The power unit described herein provides a power supply that integrates with a modular storage unit system, such as the Milwaukee PACKOUT™ modular storage unit, providing users the ability to more easily carry a power supply and one or more modular tool storage units to a location, such as a construction site, without access to a different power supply, such as hardwired power, gas generator, etc.

Figure 1:
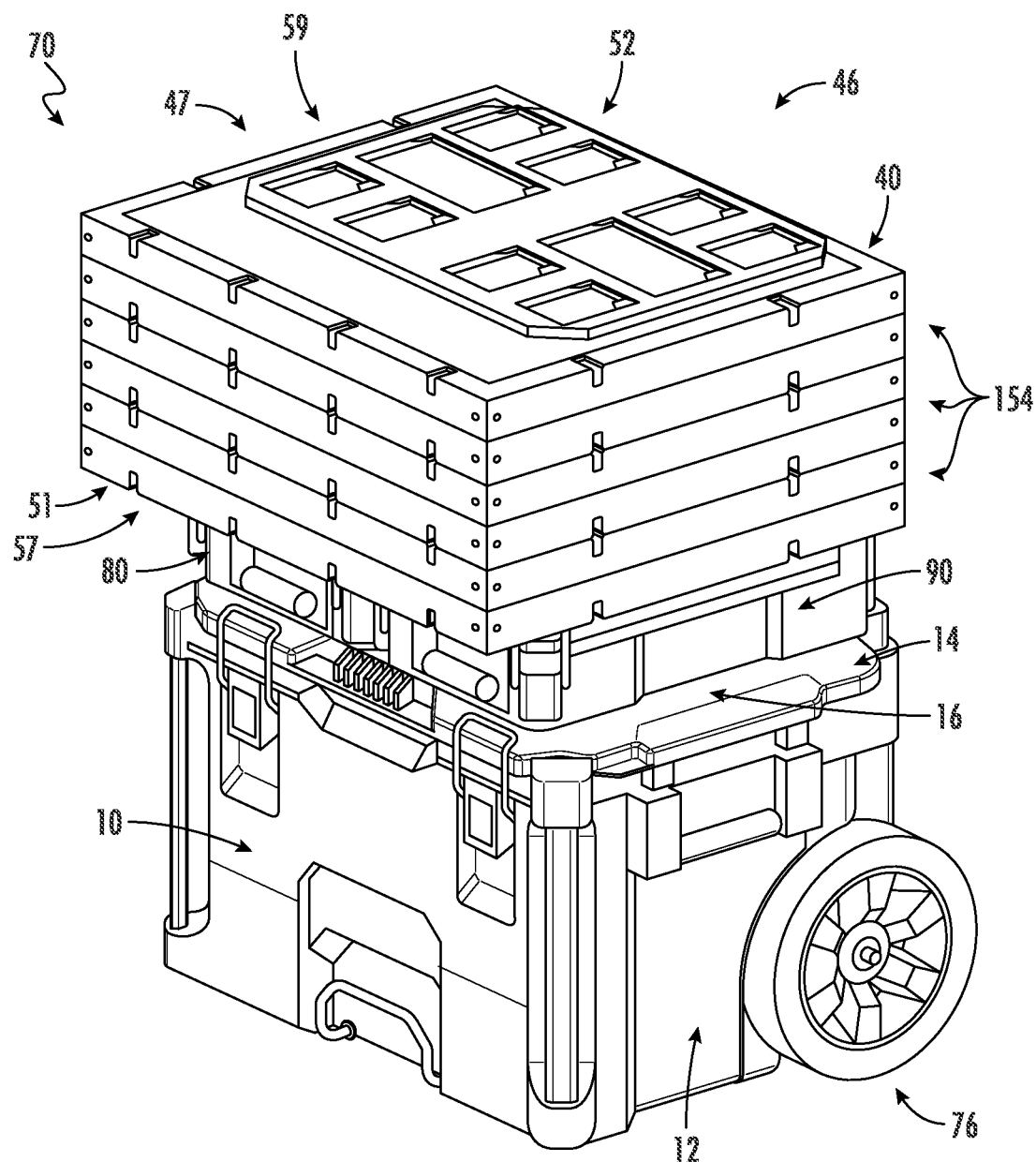
FIG. 1 is a perspective view of a mobile modular power system, according to an embodiment.
Figure 2:
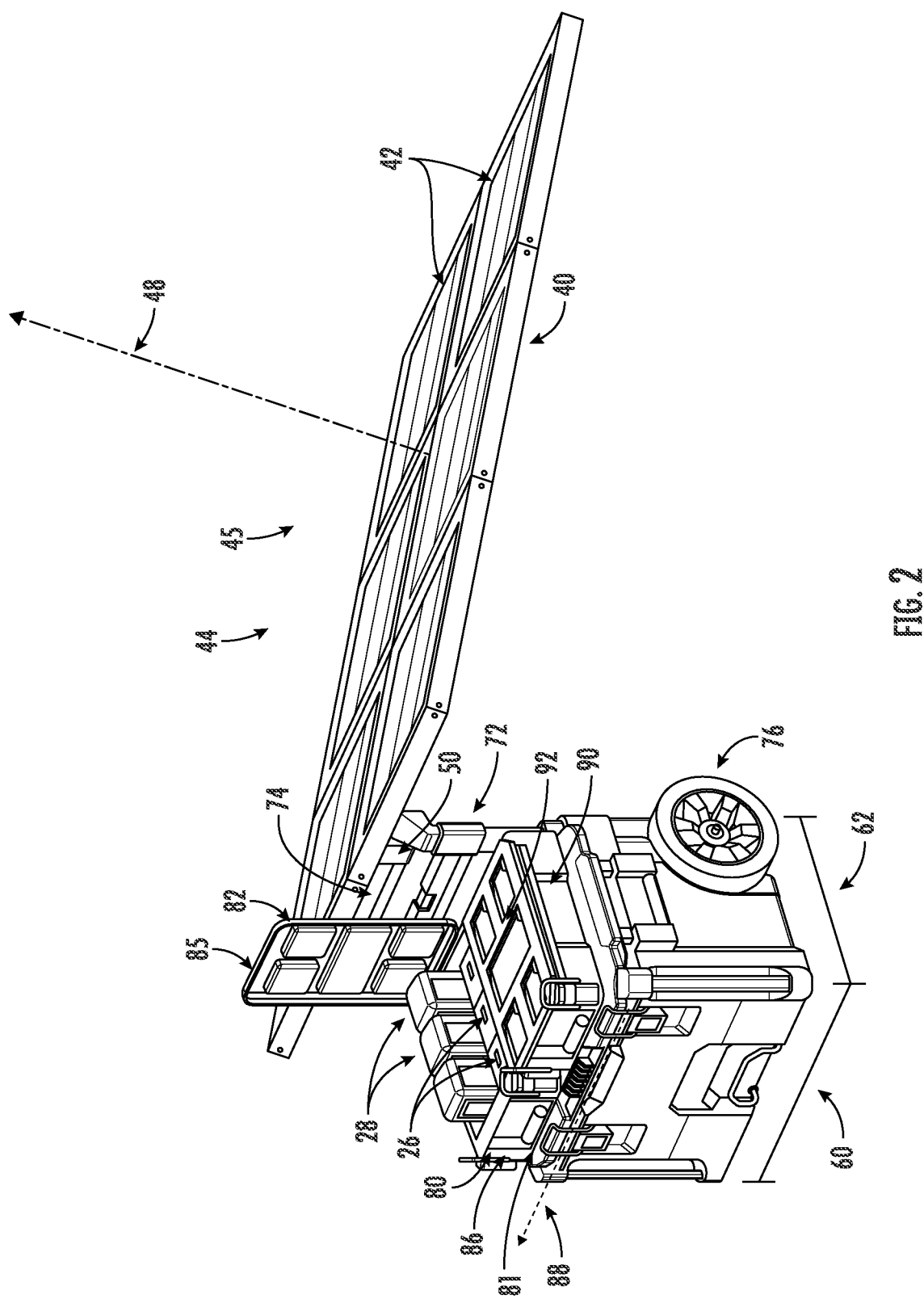
FIG. 2 is a perspective view of the mobile modular power system of FIG. 1.

Referring to FIGS. 1-2, various aspects of a modular system, shown as mobile modular power system 70, are shown. In a specific embodiment, mobile modular power system 70 includes frame 72, a plurality of wheels 76 coupled to frame 72, solar array 40 detachably and pivotally coupled to the frame 72, and one or more utility modules, shown as first utility module 10, second utility module 80, and third utility module 90. In the arrangement shown, first utility module 10 is coupled to frame 72 and wheels 76, thereby facilitating moving first utility module 10. In a specific embodiment, first utility module 10 is a power device, container with power, and/or a power unit.

The term "utility module" as used herein in its broad meaning and is meant to denote a variety of articles such as, storage containers, travel luggage, tool boxes, organizers, compacted work benches, cable storage, communication modules, carrying platforms, locomotion platforms, etc., of any shape and size, and wherein any utility module can be detachably couple to any other utility module. In a specific embodiment, the one or more utility modules described herein incorporate coupling components that are compatible with the coupling mechanism(s) described in International Patent Application No. PCT/US2018/044629, which is incorporated herein by reference in its entirety.

First utility module 10 includes housing 12, upper surface 14 of housing 12, and a fourth plurality of coupling components 16 extending from upper surface 14 of housing 12. Fourth plurality of coupling components 16 are configured to removeably couple first utility module 10 to second utility module 80 and/or third utility module 90.

Handle 74 is coupled to frame 72 and extends from frame 72. In a specific embodiment, handle 74 is slideably coupled to the frame 72 such that the handle 74 extends from the frame 72. Solar array 40 is detachably and pivotally coupled to handle 74. Solar array 40 can be actuated between an expanded configuration 44 (FIG. 2) and a retracted configuration 46 (FIG. 1) smaller than the expanded configuration 44 (e.g., having a surface area 45 less than a surface area 47 of the expanded configuration 44). In the retracted configuration 46 (FIG. 1), solar panels 54 are stacked vertically on top of each other and above first utility module 10, second utility module 80, and third utility module 90. In a specific embodiment, handle 74 is telescoping, thereby providing greater flexibility for positioning and orienting solar array 40, which is coupled to handle 74.

Solar array 40 is configured to detachably engage to the first utility module 10, the second utility module 80, or the third utility module 90. Solar array 40 includes a fifth plurality of coupling components 52, which are located at a top surface 59 of solar array 40 when arranged in the retracted configuration 46. Solar array 40 includes a third plurality of coupling components 51, which are located at a bottom surface 57 of solar array 40 opposite the upper surface when solar array 40 is arranged in the retracted configuration 46. Third plurality of coupling components 51 and fifth plurality of coupling components 52 are similar in structure and function to the other modular coupling components described herein. In various embodiments, the third plurality of coupling components 51 are configured to engage with the second plurality of coupling components 82 of the second utility module 80. In various embodiments, the third plurality of coupling components 51 are configured to engage with the fourth plurality of coupling components 16 of the first utility module 10 such that the solar array 40 in the contracted configuration is removeably coupled to the first utility module 10.

Solar array 40 includes one or more solar cells 42, which are exposed when solar array 40 is in arranged in the expanded configuration 44. Solar cells 42 convert light, such as sunlight, into electricity that is distributed via the electrical system 18 (described below). Solar array 40 is pivotally coupled to handle 74 via interface 50. Interface 50 permits solar array 40 to pivot with respect to handle 74 thereby adjusting direction 48 that solar array 40 is facing. For example, solar array 40 can be arranged at the desired orientation, and then a support structure (e.g., a support pole) can be extended between solar array 40 and one or more of coupling apertures 78 in frame 72 and/or handle 74. The plurality of coupling apertures 78 in frame 72 and/or handle 74 provide support for a corresponding plurality of orientations of solar array 40.

In a specific embodiment solar array 40 is formed from a material including riveted or bent aluminum, thereby providing lighter weight and improved rigidity compared to other materials.

Second utility module 80 includes top surface 85 opposite bottom surface 81 and second plurality of coupling components 82, which extend upwardly from top surface 85 of second utility module 80. Third utility module 90 includes sixth plurality of coupling components 92, which extend upwardly from an upper surface of third utility module 90. In a specific embodiment, both second utility module 80 and third utility module 90 are configured to detachably couple with other modular utility modules attached to their respective upper surfaces.

In various embodiments, second plurality of coupling components 82 are structurally the same as sixth plurality of coupling components 92. In a specific embodiment, second plurality of coupling components 82 includes four coupling components including a front row of at least two coupling components 82 aligned with each other in a direction 88 parallel to a front face 86 of the second utility module 80 and a rear row of at least two coupling components 82 aligned with each other in the direction 88 parallel to the front face 86 of the second utility module 80. In various embodiments, each of the plurality of coupling components recited herein are arranged similar to this arrangement of second plurality of coupling components 82 on second utility module 80 (e.g, fourth plurality of coupling components 16 includes four coupling components 16 including a front row of at least two coupling components 16 aligned with each other in a direction parallel to a front face of the first utility module 10 and a rear row of at least two coupling components 16 aligned with each other in the direction parallel to the front face of the first utility module 10).

Mobile modular power system 70 includes one or more power tool battery interfaces 26. In a specific embodiment, second utility module 80 includes the one or more power tool battery interfaces 26, which are housed within second utility module 80. The one or more power tool battery interfaces 26 configured to physically couple to a rechargeable power tool battery 28, and are electrically coupled to solar array 40 and receive power from the solar array 40. The one or more power tool battery interfaces 26 are configured to receive power from the solar array 40 and provide the received power to the rechargeable power tool battery 28. In various embodiments power tool battery interfaces 26 are configured to work one or more types of power tool batteries (e.g., M18™ power tool battery, a 12 V lithium ion power tool battery, such as an M12™ power tool battery, etc.).

First utility module 10 includes a housing 12 defining a first width 60 and a first depth 62 perpendicular to first width 60. When configured in the expanded configuration 44, solar array 40 defines a second width 64 and a second depth 66. In a specific embodiment, second width 64 and second depth 66 of solar array 40 are more than twice the first width 60 and first depth 62 of first utility module 10, respectively, and more specifically second width 64 and second depth 66 of solar array 40 are more than three times the first width 60 and first depth 62 of first utility module 10, respectively.

Figure 3:
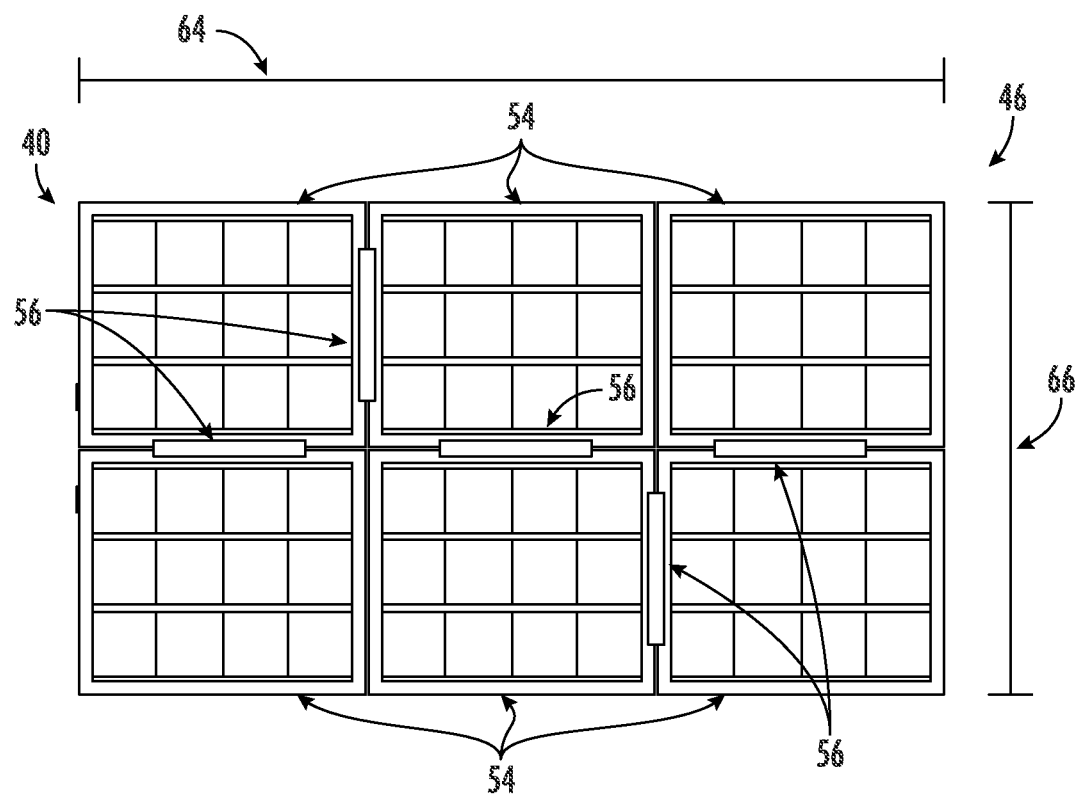
FIG. 3 is a top view of the solar array of the mobile modular power system of FIG. 1.
Figure 4:
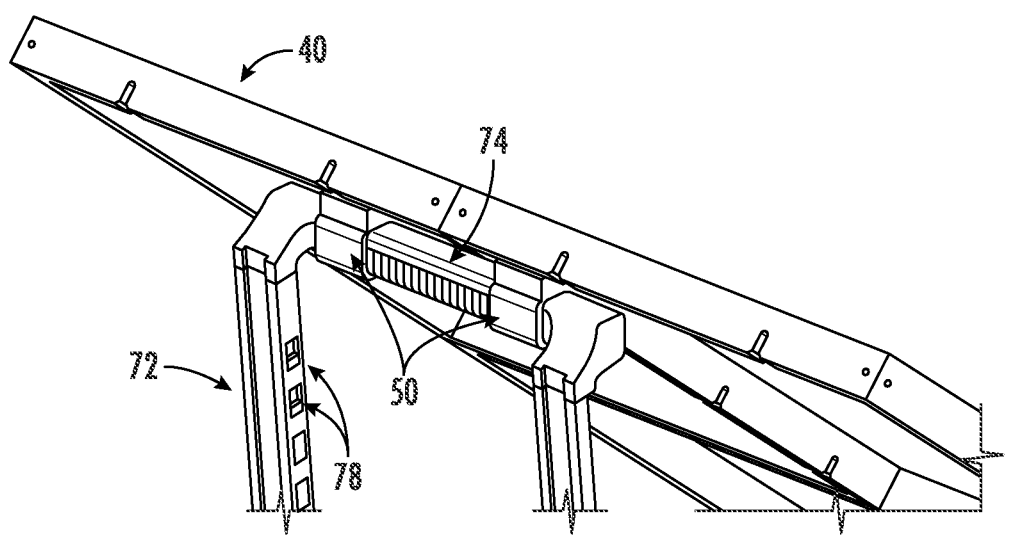
FIG. 4 is a perspective view of a portion of the mobile modular power system of FIG. 1.

Turning to FIGS. 3-4, in a specific embodiment, solar array 40 includes a plurality of adjustment mechanisms, shown as hinges 56. Hinges 56 permit solar panels 54 to be folded together (FIG. 1) or expanded apart (FIG. 2). Solar array 40 is pivotally coupled to handle 74 via interface 50, thereby allowing solar array 40 to be pivoted with respect to frame 72 and handle 74.

Figure 5:
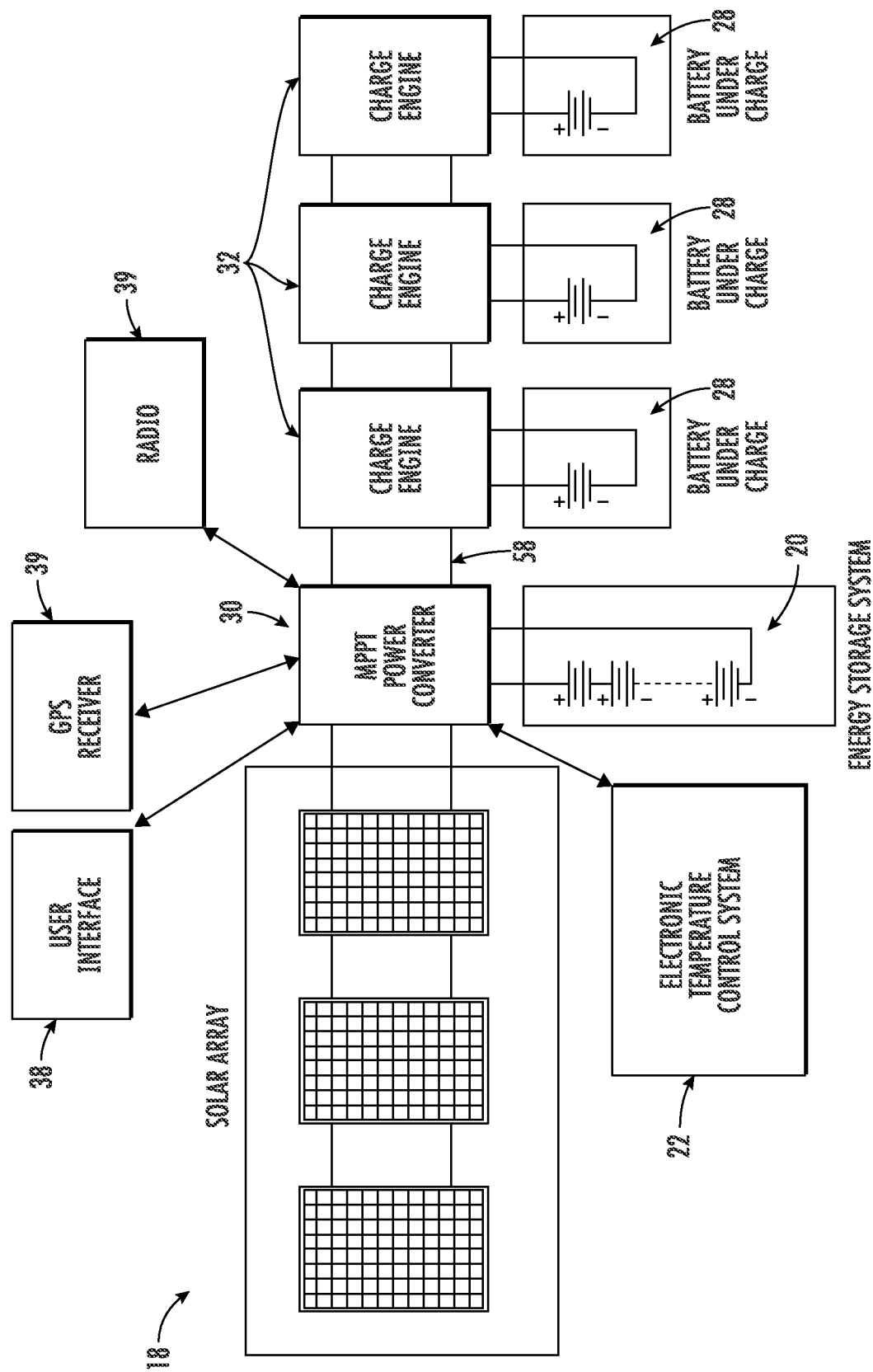
FIG. 5 is a schematic view of the electrical system of the mobile modular power system of FIG. 1.

Turning to FIG. 5, various aspects of electrical system 18 are shown. Mobile modular power system 70 includes an electrical system 18 distributed across one or more utility modules. In a specific embodiment, first utility module 10 includes electrical system 18. Solar array 40 includes one or more solar panels. Solar array 40 is electrically coupled to solar array 40, such as via power converter 30. In a specific embodiment, power converter 30 transforms the power received from solar array 40 into a tightly regulated DC output, which is provided to the rest of electrical system 18. In a specific embodiment, power tool battery interface 26 receives the power from the solar array 40 via the power converter 30, the power converter 30 transforms the power received from the solar array 40, and transmits the transformed power to the power tool battery interface 26. Power converter 30 is electrically coupled to charging devices, shown as charge engines 32, which are electrically coupled to rechargeable power tool batteries 28. In a specific embodiment, power converter 30 is electrically coupled to charge engine 32 via integrated connectors 58 (e.g., electrical connection points integrated into exterior(s) of first utility module 10 and/or second utility module 80). In use, rechargeable power tool batteries 28 receive power from charge engines 32, which receive power from solar array 40 via power converter 30.

In a specific embodiment, first utility module 10 includes battery 20 that stores electrical energy received from solar array 40. Power converter 30 is electrically coupled to an energy storage system, shown as battery 20. In a specific embodiment, battery 20 is semi-permanently coupled to mobile modular power system 70 (e.g., battery 20 can be removed, but it is more difficult to decouple battery 20 from mobile modular power system 70 than it is to decouple rechargeable power tool batteries 28 from mobile modular power system 70, which designed to be quickly coupled and decoupled from mobile modular power system 70). In various embodiments, battery 20 of mobile modular power system 70 includes a bank of batteries, one or more supercapacitors, etc. The capacity of batteries 20 within mobile modular power system 70 can be increased by adding utility modules with additional energy storage capacity (e.g., utility modules with batteries 20). In a specific embodiment, rechargeable power tool batteries 28 and battery 20 are coupled to electrical system 18 in parallel. In another embodiment, one or more of rechargeable power tool batteries 28 and battery 20 are coupled to electrical system 18 in series.

User interface 38 is electrically coupled to electrical system 18, such as via power converter 30. User interface 38 provides various output to users, such as power being input to mobile modular power system 70, power being output by mobile modular power system 70, energy storage capacity, and/or the status. In a specific embodiment, the indication of power being input to mobile modular power system 70 reflects the amount of power being input from solar array 40, and/or other external sources of power (e.g., an electrical wall outlet providing power to mobile modular power system 70, another mobile modular power system 70, receiving other renewable energies such as from wind turbines, RF energy harvesters, wave powered generators, electromechanical generators, etc.). In a specific embodiment, the indication of power being output reflects the power being output to rechargeable power tool batteries 28, to power outlets 34, described more fully below, and/or other outputs of power. In a specific embodiment, the indication of energy storage capacity reflects the power currently stored in battery 20 and/or rechargeable power tool batteries 28.

In a specific embodiment, electrical system 18 generates a signal that indicates a preferred orientation or adjustment of solar array 40 to increase power being provided by solar array 40, and user interface 38 generates a notification to the user indicating the preferred orientation or adjustment (e.g., user interface 38 displays a message to the user). In a specific embodiment, that signal is generated based at least in part on GPS data, (e.g., via the location of the mobile modular power system 70, such as determined via a GPS system). In a specific embodiment, that signal is generated based at least in part on GPS data, such as received from GPS receiver 39, and the day and time the signal is being generated.

In a specific embodiment, mobile modular power system 70 includes a radio 36. Radio 36 is electrically coupled to electrical system 18, such as via power converter 30. In a specific embodiment, radio 36 has AM functionality, FM functionality, Bluetooth functionality, and/or other wireless communications functionality.

In various embodiments, electrical system 18 is distributed across a plurality of utility modules. For example, in a specific embodiment, first utility module 10 includes and houses power converter 30, user interface 38, and/or battery 20, and second utility module 80 includes and houses rechargeable power tool batteries 28 and charge engines 32.

Figure 6:
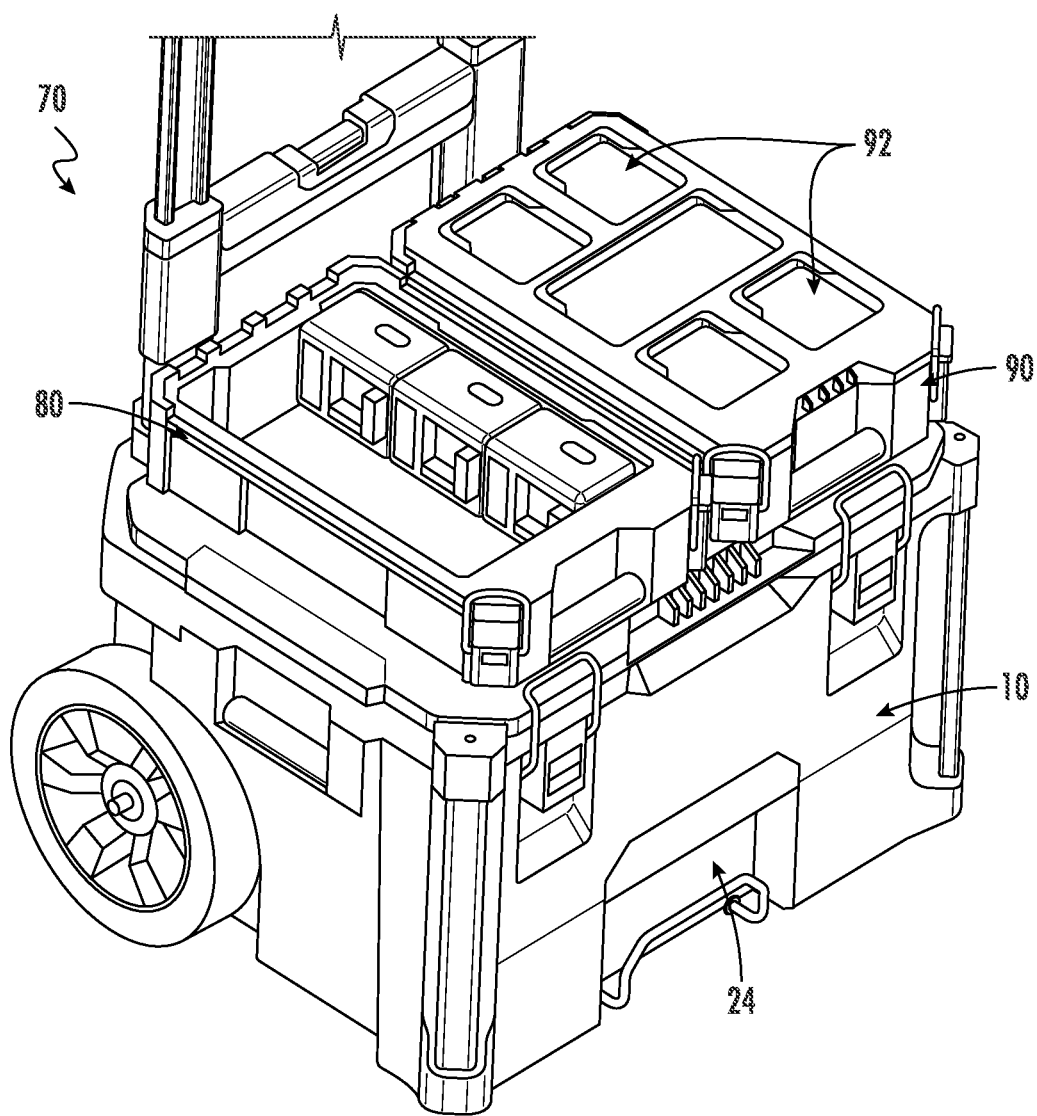
FIG. 6 is a perspective view of the mobile modular power system of FIG. 1.
Figure 7:
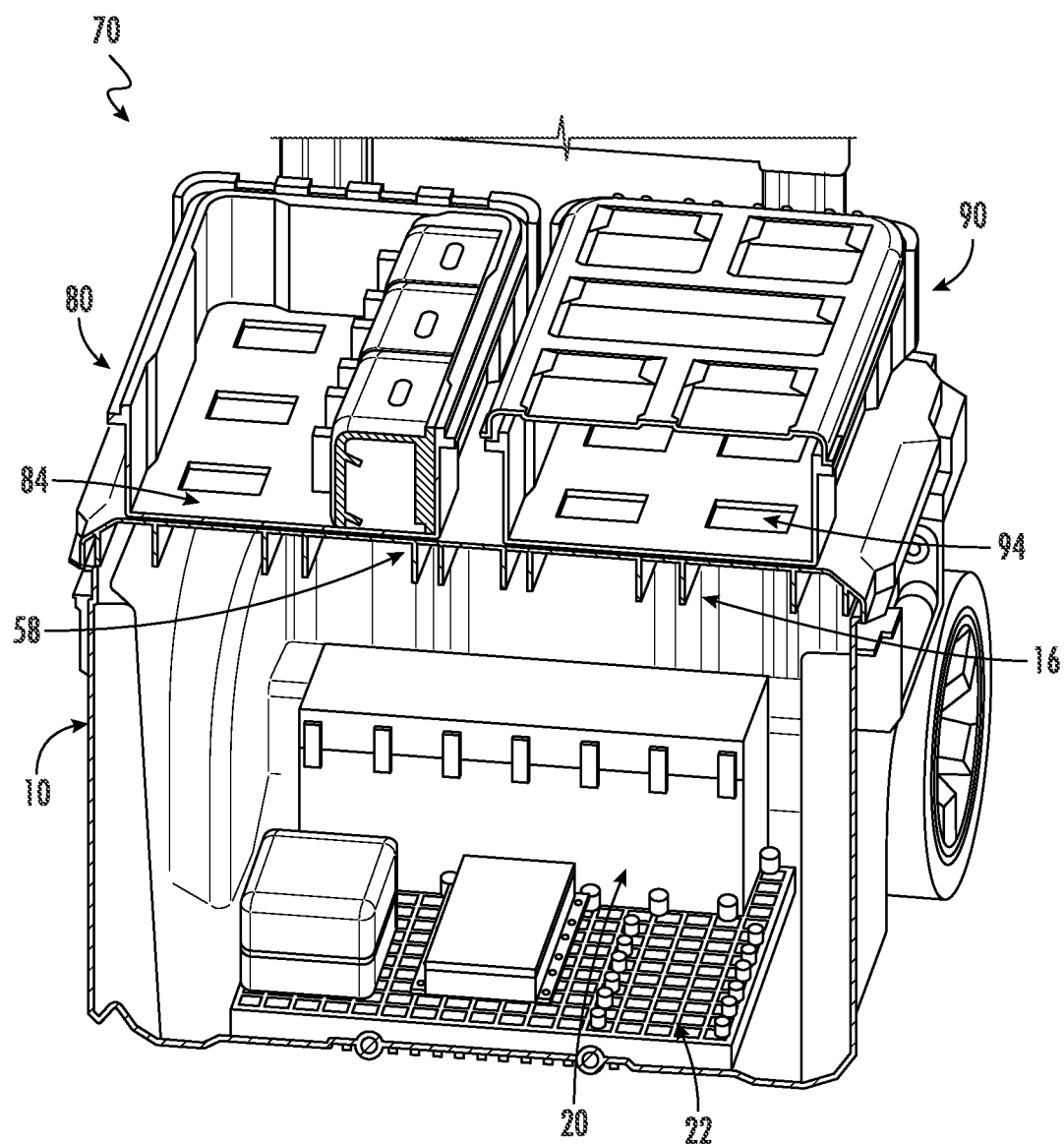
FIG. 7 is a cross-section view of the mobile modular power system of FIG. 1.
Figure 8:
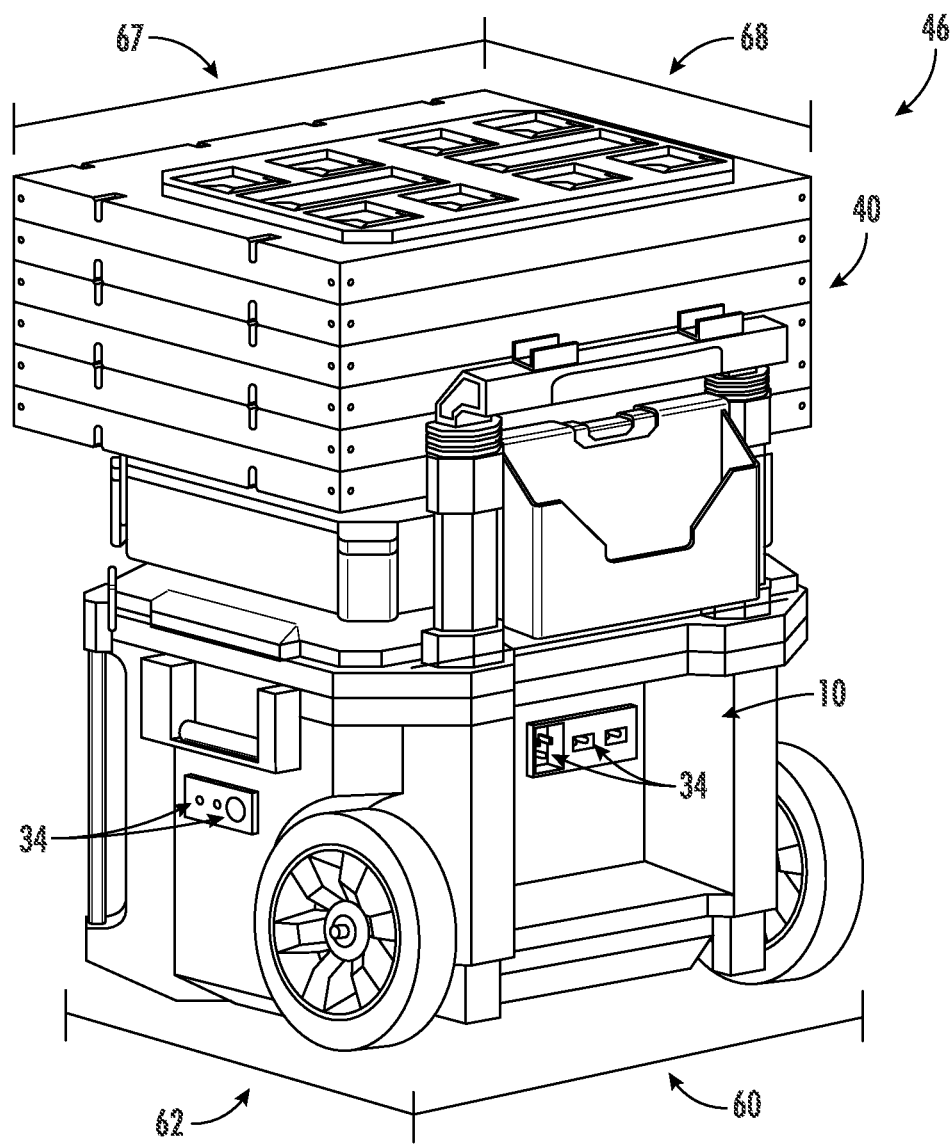
FIG. 8 is a perspective view of the mobile modular power system of FIG. 1.

Turning to FIGS. 6-8, various other aspects of mobile modular power system 70 are shown. Third utility module 90 is coupled to a top of first utility module 10 next to second utility module 80. Third utility module 90 includes sixth plurality of coupling components 92 extending from a top surface of third utility module 90. In a specific embodiment, one or more of first utility module 10, second utility module 80 and third utility module 90 include an internal storage compartment.

First utility module 10 includes one or more temperature management mechanisms, shown as louvers 24. Louvers 24 can be selectively closed or open to help regulate temperature within first utility module 10. For example, in hot weather louvers 24 may be opened to permit air flow through louvers 24 thereby reducing the buildup of heat within first utility module 10, whereas in cold weather louvers 24 may be closed to help retain any heat within first utility module 10, such as heat being generated by elements of electrical system 18.

As described above, in a specific embodiment, battery 20 is semi-permanently coupled to mobile modular power system 70, such as within first utility module 10. Electronic temperature control system 22 helps regulate temperature of mobile modular power system 70, such as by regulating the temperature of first utility module 10. In a specific embodiment, electronic temperature control system 22 includes a cooling mechanism (such as an air conditioning system) and/or a warming mechanism to regulate the temperature of first utility module 10. For example, the temperature of first utility module 10 may be regulated to help improve the operating efficiency of battery 20 when battery 20 is storing energy, when battery 20 is receiving power, and/or when battery 20 is distributing power.

As noted above, first utility module 10, second utility module 80 and third utility module 90 are detachably coupled together. Second utility module 80 includes bottom surface 81 and first plurality of coupling components 84 extending from a bottom surface 81. In one configuration, first plurality of coupling components 84 detachably couple with fourth plurality of coupling components 16 extending from a top of first utility module 10 thereby detachably engaging second utility module 80 to first utility module 10, and plurality of coupling components 94 extending from a bottom of third utility module 90 detachably couple with fourth plurality of coupling components 16 extending from a top of first utility module 10 (FIG. 7).

Turning to FIG. 8, various aspects of solar array 40 are shown. First utility module 10 defines a first width 60 and a first depth 62 perpendicular to first width 60. When stowed in the retracted configuration 46, solar array 40 defines a third width 67 and a third depth 68 and is sized to generally fit in the footprint of first utility module 10 and/or mobile modular power system 70. In a specific embodiment, at least one of first width 60 and first depth 62 of first utility module 10 is plus or minus 20% of the third width 67 and third depth 68 of solar array 40, respectively, and more specifically plus or minus 10%, and more specifically plus or minus 5%. In a specific embodiment, both first width 60 and first depth 62 of first utility module 10 are plus or minus 20% of the third width 67 and third depth 68 of solar array 40, respectively, and more specifically plus or minus 10%, and more specifically plus or minus 5%.

First utility module 10 includes one or more power outlets 34. In a specific embodiment, at least one of power outlets 34 is an interface similar to a wall outlet. In a specific embodiment, at least one of power outlets 34 is a USB-compatible interface.

Figure 9:
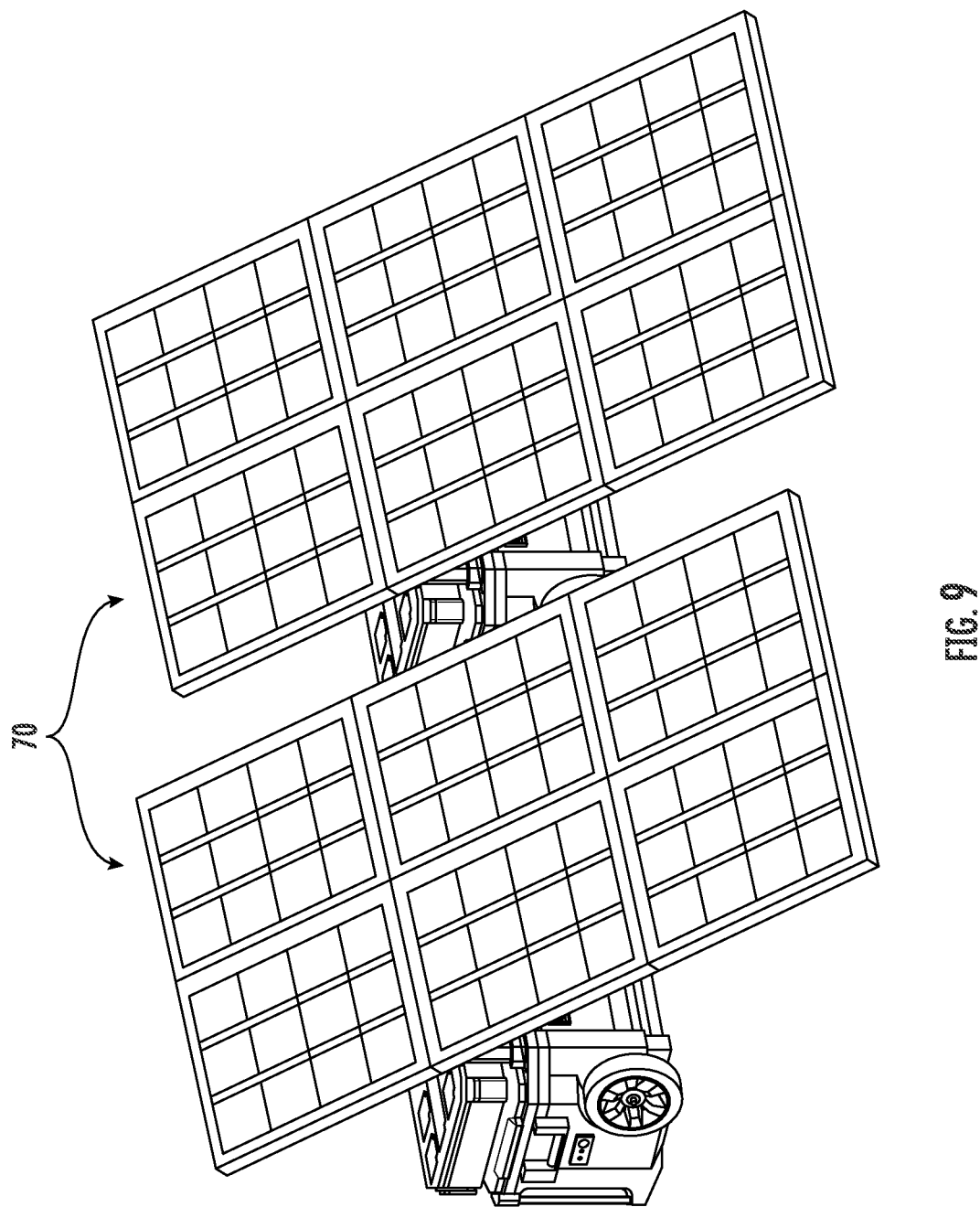
FIG. 9 is a perspective view of a two of the mobile modular power system of FIG. 1.

Turning to FIG. 9, in another embodiment two or more mobile modular power systems 70 work together to provide an expanded capacity via an array of mobile modular power systems 70. For example, a first of the mobile modular power systems 70 is electrically coupled to a second of the mobile modular power systems 70, thereby providing an increased amount of power being produced from solar energy (e.g., double the energy), an increased battery capacity, an increased number of power outlets, etc.

In another embodiment, mobile modular power system 70 includes a single utility module, first utility module 10, which includes one or more the elements described herein (e.g., all of electrical system 18 is located within first utility module 10 rather than distributed across multiple utility modules).

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A modular system comprising:
   a frame comprising a first portion and a second portion spaced from the first portion;
   a handle extending between and connecting the first portion of the frame and the second portion of the frame;
   a plurality of wheels coupled to the frame;
   a solar array detachably coupled to the frame;
   a first utility module comprising a top surface, the first utility module coupled to the frame, wherein the frame extends away from the top surface; and
   a second utility module coupled to the first utility module, the second utility module comprising a power tool battery interface configured to physically couple with a rechargeable power tool battery that receives power from the solar array.

2. The modular system of claim 1, the second utility module comprising:
   a bottom surface; and
   a first plurality of coupling components extending from the bottom surface, the first plurality of coupling components configured to couple the second utility module to the first utility module.

3. The modular system of claim 2, wherein the first plurality of coupling components comprise four coupling components comprising a front row of at least two coupling components aligned with each other in a direction parallel to a front face of the second utility module and a rear row of at least two coupling components aligned with each other in the direction parallel to the front face of the second utility module.

4. The modular system of claim 2, the second utility module comprising:
   a top surface opposite the bottom surface; and
   a second plurality of coupling components extending from the top surface, the second plurality of coupling components configured to couple the second utility module to the solar array, the second plurality of coupling components comprising four coupling components comprising a front row of at least two coupling components aligned with each other in a direction parallel to a front face of the second utility module and a rear row of at least two coupling components aligned with each other in the direction parallel to the front face of the second utility module.

5. The modular system of claim 4, the solar array comprising a third plurality of coupling components, the third plurality of coupling components configured to engage with the second plurality of coupling components of the second utility module.

6. The modular system of claim 2, the first utility module comprising
   a second plurality of coupling components extending from the top surface, the second plurality of coupling components configured to removeably couple the first utility module to the second utility module.

7. The modular system of claim 6, the first utility module comprising a battery that stores electrical energy.

8. The modular system of claim 1, the modular system comprising a power converter, the power tool battery interface receiving the power from the solar array via the power converter, the power converter transforming the power received from the solar array and transmitting the transformed power to the power tool battery interface.

9. A modular system comprising:
   a first utility module comprising a housing defining a first width and a first depth perpendicular to the first width, and an electrical system;
   a solar array comprising:
     a plurality of solar panels; and
     a first plurality of coupling components configured to detachably couple to the first utility module, the solar array electrically coupled to the electrical system, wherein the solar array is configured to actuate between an expanded configuration and a contracted configuration smaller than the expanded configuration, wherein, when the solar array is arranged in the expanded configuration, the solar array defines a second width and a second depth more than twice the first width and the first depth of the first utility module, respectively, and wherein, when the solar array is in the contracted configuration, the plurality of solar panels are stacked vertically on top of each other; and
   a second utility module coupled to the first utility module, the second utility module comprising a power tool battery interface configured to physically couple with a rechargeable power tool battery that receives power from the solar array.

10. The modular system of claim 9, the electrical system configured to generate a signal that indicates a preferred orientation of the solar array.

11. The modular system of claim 10, wherein the signal that indicates a preferred orientation of the solar array is based at least in part on GPS data.

12. The modular system of claim 9 comprising a frame, the frame extending upward and away from a top surface of the first utility module, the solar array pivotally coupled to the frame.

13. The modular system of claim 12, comprising a handle coupled to the frame, wherein the solar array is coupled to the frame via the solar array being coupled to the handle.

14. The modular system of claim 13, wherein the handle is slideably coupled to the frame such that the handle extends from the frame.

15. The modular system of claim 9,
the first utility module comprising a top surface and a first plurality of coupling components extending from the top surface, the first plurality of coupling components comprising four coupling components comprising a front row of at least two coupling components aligned with each other in a direction parallel to a front face of the first utility module and a rear row of at least two coupling components aligned with each other in the direction parallel to the front face of the first utility module; and
the solar array comprising a second plurality of coupling components, the second plurality of coupling components configured to detachably couple with the first plurality of coupling components of the first utility module.

16. A modular system comprising:
a first utility module comprising a housing comprising a top surface, and a first plurality of coupling components located along the top surface;
a solar array comprising a plurality of solar panels, the solar array configured to actuate between an expanded configuration and a contracted configuration smaller than the expanded configuration, the solar array comprising a second plurality of coupling components, the second plurality of coupling components configured to detachably engage with the first plurality of coupling components of the first utility module such that the solar array in the contracted configuration is removeably coupled to the first utility module; and
a second utility module coupled to the first utility module, the second utility module comprising a power tool battery interface configured to physically couple with a rechargeable power tool battery that receives power from the solar array;
wherein, when the solar array is in the contracted configuration, the plurality of solar panels are stacked vertically on top of the first utility module and the second utility module.

17. The modular system of claim 16, wherein the first plurality of coupling components comprising a front row of at least two coupling components aligned with each other in a direction parallel to a front face of the first utility module and a rear row of at least two coupling components aligned with each other in the direction parallel to the front face of the first utility module.

18. The modular system of claim 16, the solar array comprising a bottom surface and a top surface opposite the bottom surface when the solar array is in the contracted configuration, the second plurality of coupling components extending from the bottom surface of the solar array.

19. The modular system of claim 18, the solar array comprising a third plurality of coupling components extending from the top surface of the solar array, the modular system comprising a second utility module, the second utility module comprising a power tool battery interface configured to physically couple with a rechargeable power tool battery that receives power from the solar array when the solar array is in the expanded configuration.

20. The modular system of claim 16, the first utility module comprising a battery that stores electrical energy received from the solar array.

21. The modular system of claim 9, wherein the solar array further comprises a second plurality of coupling components, wherein the second plurality of coupling components are located at a top, upward facing surface of the solar array when in the contracted configuration and wherein the first plurality of coupling components are located at a bottom surface when in the contracted configuration.

22. The modular system of claim 1, wherein the frame further comprises a plurality of apertures defined in a surface of the first portion of the frame, wherein the surface faces the second portion of the frame.

* * * * *